United States Patent
Kaneko et al.

(10) Patent No.: US 8,884,232 B2
(45) Date of Patent: Nov. 11, 2014

(54) RADIATION DETECTION DEVICE

(75) Inventors: Yasuhisa Kaneko, Kanagawa (JP); Haruyasu Nakatsugawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 316 days.

(21) Appl. No.: 13/477,721

(22) Filed: May 22, 2012

(65) Prior Publication Data

US 2012/0298874 A1 Nov. 29, 2012

(30) Foreign Application Priority Data

May 24, 2011 (JP) ................................ 2011-115881

(51) Int. Cl.
*G01T 1/202* (2006.01)

(52) U.S. Cl.
CPC ...................................... *G01T 1/202* (2013.01)
USPC .................................. 250/361 R; 250/370.11

(58) Field of Classification Search
CPC ........................................................ G01T 1/202
USPC .................................. 250/361 R, 362, 370.11
See application file for complete search history.

(56) References Cited

U.S. PATENT DOCUMENTS

| | | |
|---|---|---|
| 2004/0174951 A1 | 9/2004 | Hoffman |
| 2008/0290285 A1 | 11/2008 | Wakamatsu |
| 2010/0244169 A1 | 9/2010 | Maeda et al. |

FOREIGN PATENT DOCUMENTS

| | | |
|---|---|---|
| JP | 3993176 B2 | 10/2007 |
| JP | 2008-026013 A | 2/2008 |
| JP | 2010-272612 A | 12/2010 |
| JP | 2011-017683 A | 1/2011 |
| JP | 2012-181108 A | 9/2012 |
| JP | 2012-237562 A | 12/2012 |
| WO | 20101029779 A1 | 3/2010 |

OTHER PUBLICATIONS

Japanese Notification of Reason for Refusal issued on Jul. 24, 2014 in connection with Japanese Patent Application No. 2011-115881.

*Primary Examiner* — Mark R Gaworecki
(74) *Attorney, Agent, or Firm* — Jean C. Edwards, Esq.; Edwards Neils PLLC (57) ABSTRACT

A scintillator receives radiation and produces light. The scintillator is composed of columnar crystals arranged upright. Conical end portions of the columnar crystals are embedded in a resin layer formed on a light detection section. The resin layer, made from a thermosetting resin material, is heated and cured with the end portions embedded therein. Because a refractive index of the resin layer is lower than that of the columnar crystals, average refractive indices of respective layers between the columnar crystals and the light detection section change continuously. The resin layer prevents the end portions from damage and improves efficiency of incidence on the light detection section.

18 Claims, 9 Drawing Sheets

RADIATION DETECTION DEVICE

CROSS-REFERENCE TO RELATED APPLICATIONS

The present application claims priority from Japanese Patent Application No. 2011-115881 filed on May 24, 2011, the contents of which are herein incorporated by reference in their entirety.

BACKGROUND OF THE INVENTION

1. Field of the Invention

The present invention relates to an indirect conversion type radiation detection device for converting incident radiation into light and then converting the light into electric charge.

2. Description Related to the Prior Art

Recently, radiation detection devices for converting incident radiation (e.g. X-rays, gamma rays, or alpha rays) into electric charge and producing radiation image data based on the electric charge have been used. The radiation image data represents distribution of an amount of the incident radiation. There are two types of radiation detection devices: a direct conversion type and an indirect conversion type. The direct conversion type radiation detection device converts the radiation directly into the electric charge. The indirect conversion type radiation detection device converts the radiation into light and then converts the light into the electric charge.

The indirect conversion type radiation detection device includes a light detection section and a scintillator (phosphor layer). The light detection section has a substrate and a plurality of pixels formed on the substrate. The scintillator is layered on the light detection section. Each pixel has a photodiode (PD) and a thin film transistor (TFT). The scintillator is made from CsI, GOS ($Gd_2O_2S$:Tb), or the like. The scintillator converts the incident radiation into visible light. The PD of the light detection section converts the light, converted by the scintillator, into the electric charge and stores the electric charge. The electric charge is read out through the TFTs.

The indirect conversion type radiation detection device is classified into a PSS (Penetration Side Sampling) type and an ISS (Irradiation Side Sampling) type. In the PSS type radiation detection device, the scintillator and the light detection section are disposed in this order from a radiation incidence side. Namely, the radiation is incident on the scintillator first. The ISS type, on the contrary, has the light detection section and the scintillator disposed in this order from the radiation incidence side. Namely, the radiation is incident on the light detection section first. The radiation passed through the light detection section is incident on the scintillator. The scintillator converts the incident radiation into the light, and then emits the light in a direction opposite to the radiation incident direction. The PD of the light detection section detects the light. An amount of the light emitted from a radiation incident surface of the scintillator is greater than that from a back face opposite to the radiation incident surface. In the ISS type, the light detection section is disposed close to the radiation incident surface of the scintillator. Accordingly, the ISS type achieves sensitivity and sharpness higher than those of the PSS type.

U.S. Patent Application Publication No. 2008/0290285 (corresponding to Japanese Patent Laid-Open Publication No. 2008-26013) discloses a radiation detection device having a scintillator composed of a plurality of columnar crystals made from CsI or the like. The columnar crystals are arranged such that their end portions face a light detection section. The columnar crystals receive radiation and produce light. Due to the light guide effect of the columnar crystals, the light propagates through the columnar crystals. This reduces scattering of the light emitted from the scintillator and thus improves sharpness of a detection image.

U.S. Patent Application Publication No. 2004/0174951 (corresponding to Japanese Patent No. 3993176) discloses an uneven surface of a light detection section on which light from the scintillator is incident. This increases sensitivity of the indirect conversion type radiation detection device. To be more specific, the uneven surface has a plurality of pyramidal protrusions to improve efficiency of incidence on the light detection section. It has been well known in the field of solid-state image sensors to utilize the uneven surface which varies the refractive index continuously to prevent reflection of the incident light so as to improve the efficiency of incidence (for example, see U.S. Patent Application Publication No. 2010/0244169 corresponding to Japanese Patent Laid-Open Publication No. 2010-272612).

However, when the scintillator has the uneven surface with each columnar crystal tapered or pointed as described in the U.S. Patent Application Publication No. 2008/0290285, or when the light detection section has the uneven surface as described in the U.S. Patent Application Publication No. 2004/0174951, the uneven surfaces may be damaged due to the contact between the scintillator and the light detection section. This reduces sensitivity and sharpness.

SUMMARY OF THE INVENTION

An object of the present invention is to provide a radiation detection device for preventing a scintillator and a light detection section from damage.

To achieve the above and other objects, the radiation detection device of the present inventions includes a scintillator, a light detection section, and a resin layer disposed between the scintillator and the light detection section. The scintillator has a plurality of columnar crystals arranged upright. The scintillator converts radiation into light and emits the light from end portions of the columnar crystals. The light detection section is disposed to face the end portions of the columnar crystals. The light detection section detects the light incident from the end portions. The resin layer has recesses formed by the end portions pressed against the resin layer. At least a part of each end portion is embedded in each recess. The resin layer passes the light from the end portions.

It is preferable that the resin layer is made from a thermosetting resin material. It is preferable that the resin layer passes light having an emission peak wavelength of the scintillator. It is preferable that a refractive index of the resin layer is lower than a refractive index of the scintillator.

It is preferable that each end portion of the columnar crystal is tapered. It is preferable that the columnar crystals are separated from each other by a gap between them.

It is preferable that the radiation passed through the light detection section is incident on the scintillator, in other words, it is preferable that the scintillator is of an ISS type. It is preferable that the scintillator is made from cesium iodide.

It is preferable that the light detection section has a substrate and a pixel portion formed on the substrate, and the resin layer is formed on the pixel portion. It is preferable that the light detection section has a substrate and a pixel portion formed on the substrate, and a planarizing layer may be formed on the pixel portion. The resin layer may be formed on the planarizing layer.

In this case, it is preferable that a detachable adhesive is provided on a peripheral portion of the planarizing layer between the planarizing layer and the resin layer.

It is preferable that adhesion of the detachable adhesive is reduced by applying UV radiation.

Furthermore, it is preferable that the light detection section has a substrate and a pixel portion formed on the substrate, and an uneven section is formed on the pixel portion. The uneven section has a plurality of projections protruding toward the scintillator. It is preferable that the resin layer is formed such that the projections are embedded in the resin layer.

The end portions may be in contact with the light detection section.

It is preferable that an average refractive index changes continuously between the end portions and the pixel portion.

It is preferable that the planarizing layer is made from an inorganic material.

It is preferable that the uneven section is made from an inorganic material.

It is preferable that an arrangement pitch of the projections is smaller than an emission peak wavelength of the scintillator.

According to the radiation detection device of the present invention, the resin layer, with recesses formed by pressing the end portions against the resin layer, is disposed between the scintillator and the light detection section. Thereby, the resin layer prevents the end portions from damage. In the configuration using the resin layer, average refractive indices of the respective layers between the scintillator and the light detection section change gradually. This improves the efficiency of incidence on the light detection section.

The resin layer is formed easily with the use of the thermosetting resin material. The thermosetting resin material is heated and cured with the end portions of the columnar crystals embedded therein.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
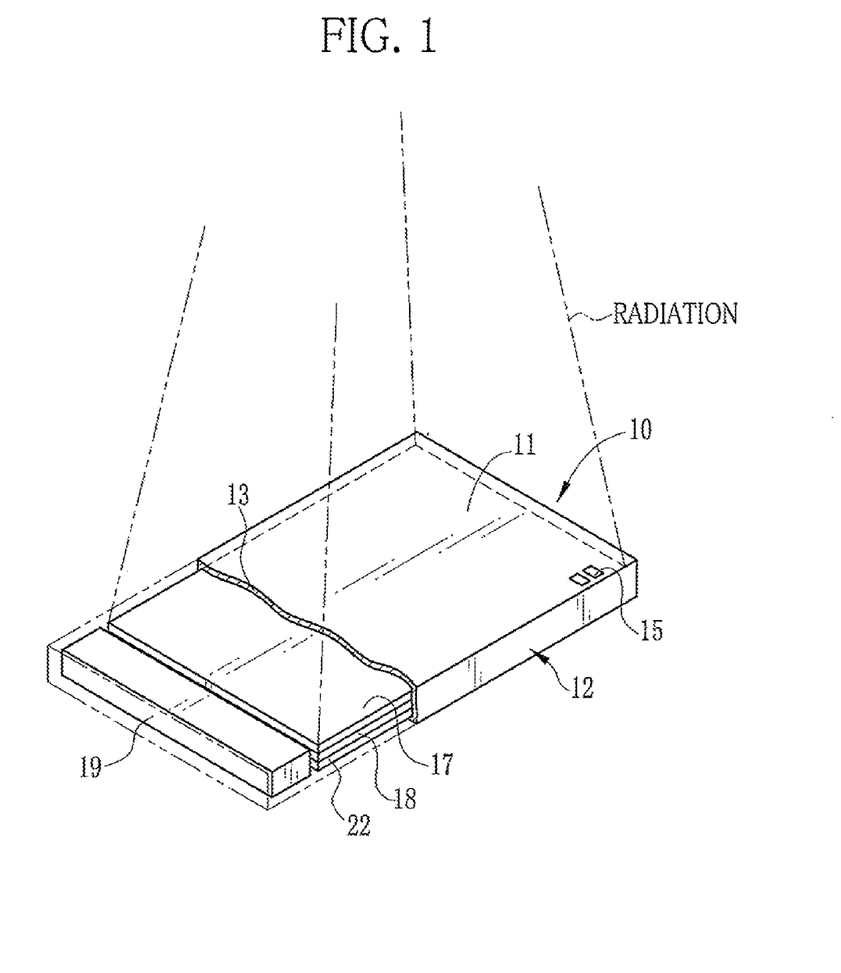
FIG. 1 is a partially cross-sectional perspective view of an electronic cassette of the present invention.

In FIG. 1, an electronic cassette 10 is a portable radiation detection device provided with a housing 12. The housing 12 is made from a material which transmits radiation, and has a substantially box-like shape with a rectangular top surface, being a radiation incident surface 11. The radiation passed through a subject's body (patient's body) is incident on the radiation incident surface 11. The radiation incident surface 11 is provided on a top plate 13 of the housing 12. The housing 12, other than the top plate 13, is made from ABS resin and the like. The top plate 13 is made from a material with low radiation absorption, for example, carbon, which provides sufficient strength to the top plate 13.

The radiation incident surface 11 of the electronic cassette 10 is provided with an indicator section 15 having two or more LEDs. The indicator section 15 indicates an operation status (for example, "ready", or "data transmission") of the electronic cassette 10 and other status information such as remaining battery capacity. The indicator section 15 may be composed of light emitting elements other than the LEDs. The indicator section 15 may be a display device such as an LCD or an organic light emitting display. The indicator section 15 may be disposed in a position other than the radiation incident surface 11.

Inside the housing 12 of the electronic cassette 10, a light detection section 17 and a scintillator 18 are disposed in this order from the radiation incident surface 11, in a direction of travel of the radiation passed through the patient's body. Additionally, inside the housing 12, a case 19 is disposed along one of ends in a lengthwise direction of the radiation incident surface 11. The case 19 accommodates various electronic circuits including a microcomputer and a rechargeable and detachable battery (secondary cell). Power supplied from the battery activates the electronic circuits of the electronic cassette 10 including the light detection section 17. To avoid damage to the electronic circuits caused by the radiation, the radiation incident surface 11 side of the case 19 is provided with a radiation shielding member (not shown) such as a lead plate.

Figure 2:
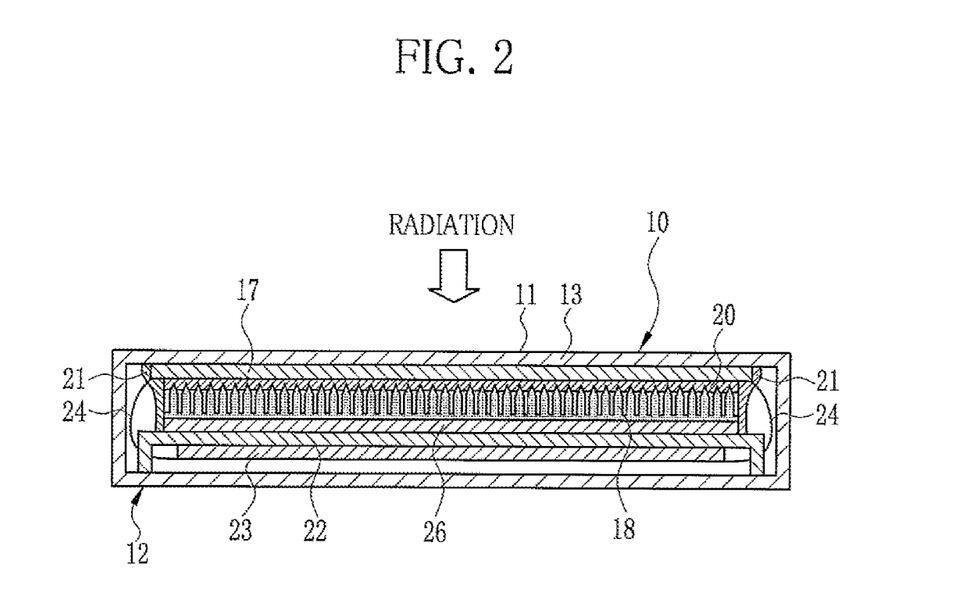
FIG. 2 is a schematic cross-sectional view of the electronic cassette.

As shown in FIG. 2, the light detection section 17 is affixed to a whole inner face of the top plate 13. A resin layer 20 is provided between the light detection section 17 and the scintillator 18. The light detection section 17 is affixed to a surface of the resin layer 20. The scintillator 18 is affixed to the other surface of resin layer 20. A soft fixing member 21 encircles only the peripheries of the light detection section 17 and the scintillator 18 to fix them. A base 22 is placed on a bottom face inside the housing 12. A control board 23 is attached to an undersurface of the base 22. The control board 23 and the light detection section 17 are electrically connected through a flexible cable 24.

Figure 3:
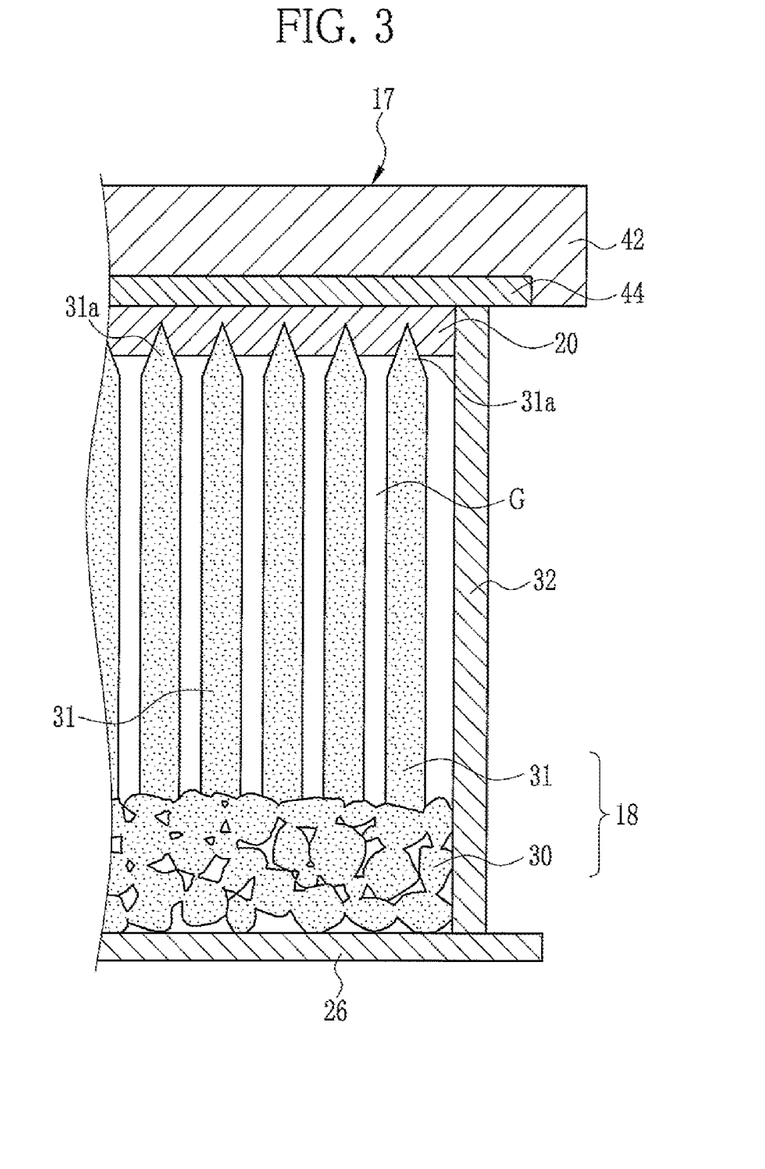
FIG. 3 is a schematic cross-sectional view of the scintillator.

In FIG. 3, the scintillator 18 has a deposition substrate 26 and a plurality of pillar or columnar crystals 31 arranged upright or in standing positions due to crystal growth on the deposition substrate 26. The radiation passed through the patient's body is incident on the radiation incident surface 11 of the housing 12 and then passes through the top plate 13 and the light detection section 17 so as to be incident on the scintillator 18. The scintillator 18 converts the incident radiation into light and emits the light (visible light).

The scintillator 18 is formed by deposition of thallium activated cesium iodide (CsI:Tl) on the deposition substrate 26. Non-columnar crystals 30 are formed on the deposition substrate 26 side. The columnar crystals 31 are formed on the light detection section 17 side. It is preferable that the deposition substrate 26 is made from a material with high heat resistance. Aluminum is preferable in view of low cost. The columnar crystals 31 are separated from each other by a gap G. The average diameter (several μm to 10 μm) of the columnar crystals 31 is substantially consistent in its lengthwise direction. The scintillator 18 may be formed with sodium activated cesium iodide (CsI:Na) or the like instead of the CsI:Tl.

Because the radiation is incident on the scintillator 18 through the light detection section 17, the scintillator 18 produces light mainly on the light detection section 17 side of the columnar crystals 31. Due to the light guide effect of the columnar crystal 31, the light produced inside the scintillator 18 propagates through the columnar crystal 31 to an end portion 31a of the columnar crystal 31, and then exits from the end portion 31a to the light detection section 17. Each end portion 31a has a tapered or pointed shape, for example, a substantially conical shape with an acute apex angle (for example, 40° to 80°). As described in WO2008/029610, the conically or pyramidally-shaped end portion 31a causes less light reflection than a convex-shaped end portion, thus improving efficiency of light emission from the columnar crystal 31. The length of each end portion 31a is several μm to 10 μm.

Due to the light guide effect, the light produced inside the columnar crystal 31 also propagates through the columnar crystal 31 to the non-columnar crystal 30, which reflect the light back to the light detection section 17 side. This further improves the efficiency of the light emission from the columnar crystal 31.

The columnar crystals 31 are arranged to be separated from each other. A filling rate (a percentage of the columnar crystals 31 in a given area) is optimally in a range of in the order of 70% to 85%, for example. When the filling rate is too low (for example, less than 70%), an amount of light emission from the scintillator 18 decreases significantly. When the filling rate is too high (for example, greater than 85%), the adjacent columnar crystals 31 are likely to come in contact with each other. This causes cross-talk, resulting in decrease in sharpness of the image.

The resin layer 20 is made from a thermosetting resin material in a gel form. More specifically, phenol resin, urea resin, melamine resin, unsaturated polyester resin, epoxy resin, diallyl phthalate resin, and the like are preferable. The resin layer 20 transmits the light of at least an emission peak wavelength (approximately 565 nm when CsI:Tl is used) of the scintillator 18.

The light detection section 17 has the TFT substrate 42 and a pixel portion 44 formed on a surface layer of the TFT substrate 42. The resin layer 20 is formed on a surface of the pixel portion 44. The end portions 31a of the columnar crystals 31 are put into or embedded into the resin layer 20 such that the resin layer 20 surrounds a part or the whole of each end portion 31a. Thereby, recesses are formed on the resin layer 20. A portion of the resin layer 20 other than the recesses has the thickness of several μm to 10 μm. Note that there are some variations in heights of the apex portions of the end portions 31a. So, it is preferable that the resin layer 20 has sufficient thickness to make sure that all the apex portions of the end portions 31a are embedded in the resin layer 20.

In this embodiment, the end portions 31a are placed not to be in contact with the light detection section 17. Alternatively, the end portions 31a may be in contact with the light detection section 17. Note that it is preferable not to create a gap between the end portion 31a and the resin layer 20, because the gap increases a difference in refractive index between the end portion 31a and the gap, which is likely to cause total reflection of the light.

Figure 4:
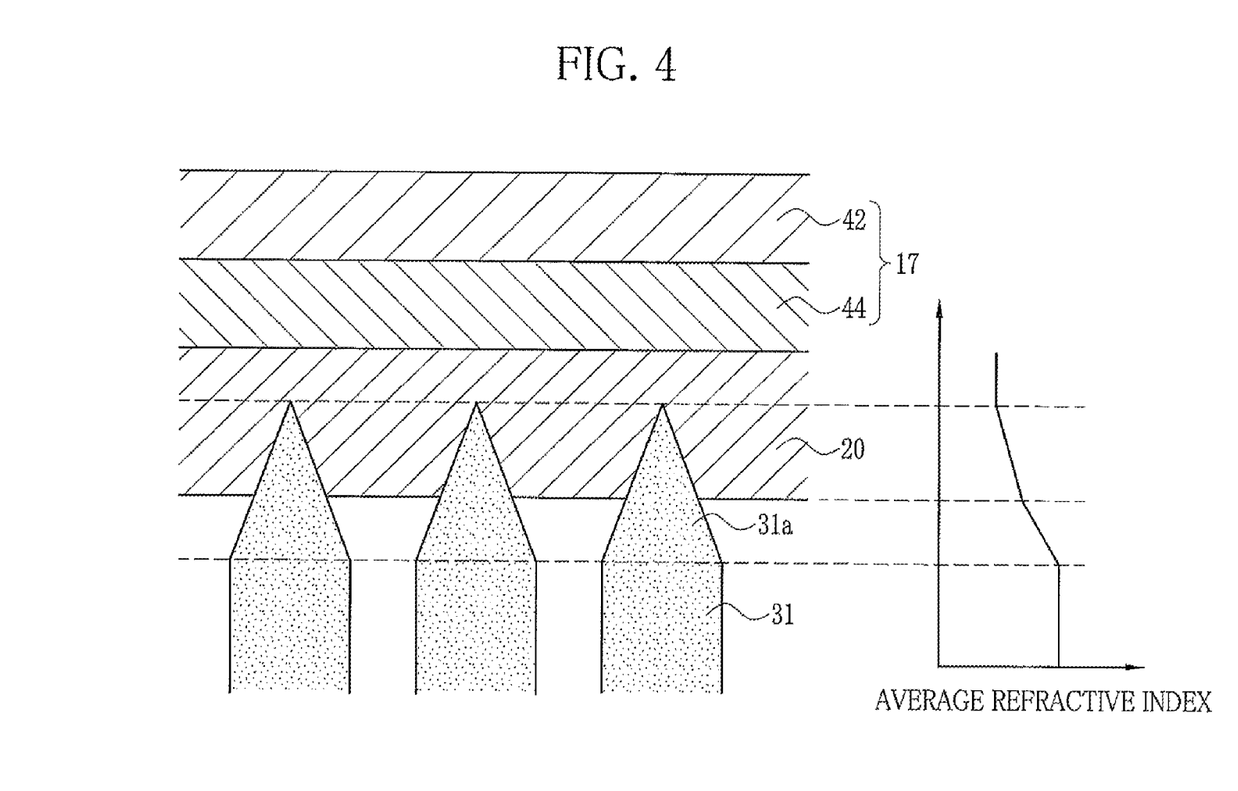
FIG. 4 is an explanatory view of average refractive index of each layer between a scintillator and a light detection section.

A refractive index $n_1$ of the scintillator 18 (end portions 31a) is approximately 1.8. A refractive index $n_2$ (for example, approximately 1.5) of the resin layer 20 is lower than that of the scintillator 18. In FIG. 4, an average refractive index refers to an average refractive index of each layer. The average refractive index changes gradually or continuously, depending on the shape of each end portion 31a and a relation between the refractive index $n_1$ of the end portions 31a and the refractive index $n_2$ of the resin layer 20. The continuous changes in the average refractive index prevent reflection of the light incident on the pixel portion 44 from the end portions 31a and improve efficiency of incidence on the pixel portion 44.

A protection film 32 surrounds the scintillator 18. The protection film 32, being a barrier to atmospheric moisture, is an organic film produced by vapor-phase polymerization such as thermal CVD or plasma CVD, for example. For the organic film, a vapor-phase polymerized film formed by the thermal CVD of poly(p-xylylene) resin or a plasma polymerized film of fluorine-containing unsaturated hydrocarbon monomer is used. Alternatively, a layer structure of organic and inorganic films can be used. Examples of the preferable materials of the inorganic film include silicon nitride ($SiN_x$) film, silicon oxide ($SiO_x$) film, and silicon oxynitride ($SiO_xN_y$) film, and $Al_2O_3$.

Figure 5A:
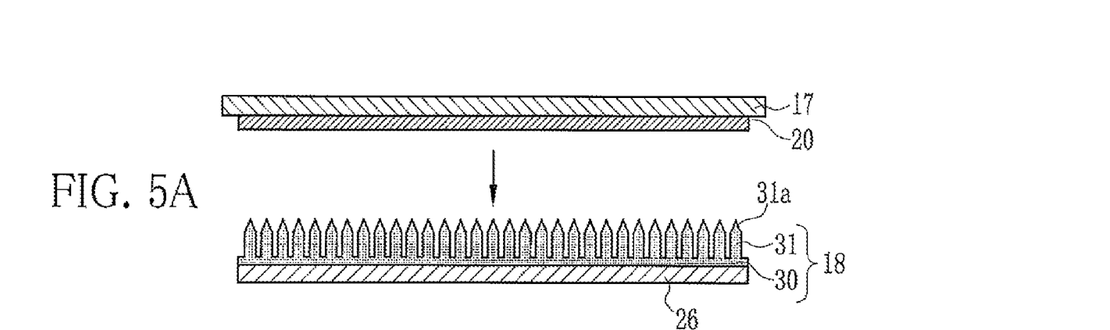
FIGS. 5A and 5B are explanatory views showing a method for bonding the light detection section to the scintillator.

Next, a method for bonding the light detection section 17 and the scintillator 18 is described. As shown in FIG. 5A, the resin layer 20 is formed by applying the thermosetting resin material in a gel form composed of phenol resin, for example, to the surface of the light detection section 17. The light detection section 17 is placed on the scintillator 18 such that the resin layer 20 is placed on the end portions 31a of the columnar crystals 31.

Figure 5B:
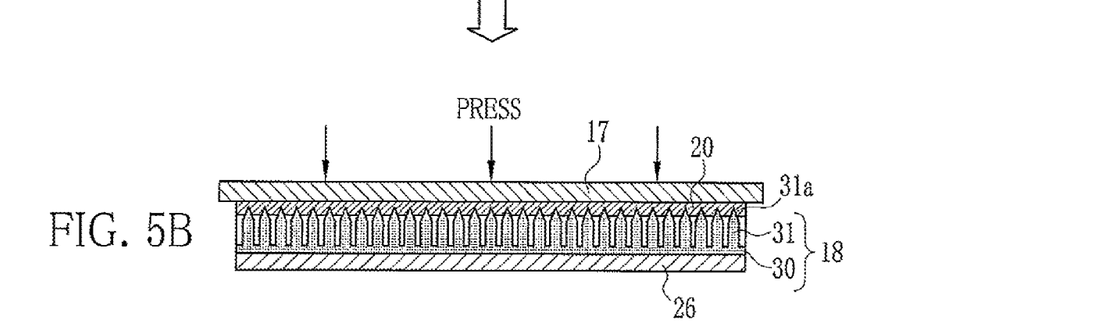

Then, as shown in FIG. 5B, the whole light detection section 17 is pressed against the scintillator 18 with a uniform pressing force. Thereby, at least a part of each end portion 31a is embedded in the resin layer 20. For example, a pressing plate of substantially the same size as the light detection section 17 may be used to press the whole light detection section 17 at a time. Alternatively, a press roller that rotates on the light detection section 17 may be used. Note that the appropriate pressing force is applied to prevent the end portions 31a from breaking.

The resin layer 20 is heated and cured while the light detection section 17 is pressed against the scintillator 18. The heating temperature is in a range of the order of, for example, 100° C. to 150° C., depending on the thermosetting resin material used. It is preferable not to overheat the scintillator 18, because the overheated scintillator 18 causes a gap between the scintillator 18 and the resin layer 20 when brought back to room temperature, due to a high coefficient of thermal expansion (of the order of 50 PPM) of the CsI:Tl.

Figure 6:
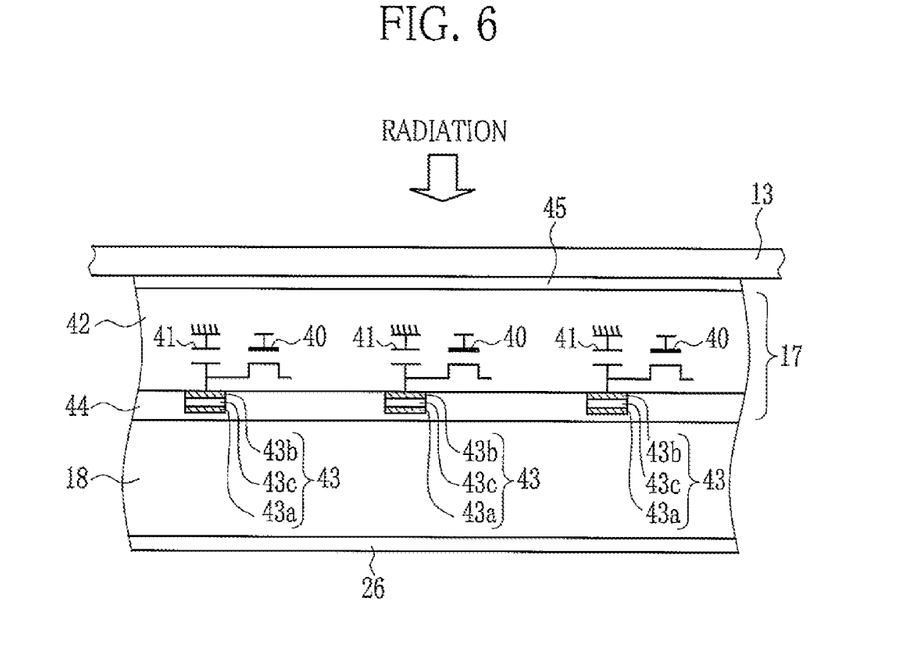
FIG. 6 is a schematic cross-sectional view of the light detection section.

Next, the light detection section 17 is described. In FIG. 6, the light detection section 17 includes a TFT substrate 42 and the pixel portion 44. The TFT substrate 42 has thin film transistors (TFTs) 40 and capacitors 41 arranged in a matrix. In the pixel portion 44, photoelectric conversion portions 43 are arranged in a matrix such that each photoelectric conversion portion 43 is connected to the TFT 40 and the capacitor 41. Each photoelectric conversion portion 43 is composed of a photodiode (PD).

In this embodiment, the light detection section 17 is placed on the radiation incident side (the front side) of the scintillator 18. This configuration is called ISS (Irradiation Side Sampling) type. On the other hand, a radiation detection device with the light detection section placed on the opposite side of the radiation incident side, that is, on the back side of the scintillator is called PSS (Penetration Side Sampling) type. An amount of light emitted from the radiation incident side of the scintillator is greater than that from the opposite side thereof. In the ISS type, the light detection section faces the radiation incident side of the scintillator. Accordingly, a distance between the light detection section and a light emitting position of the scintillator is shorter in the ISS type than in the PSS type. Accordingly, the radiation image obtained with the ISS type has resolution higher than that obtained with the PSS type. Additionally, in the ISS type, the amount of the light received by the light detection section increases, which improves sensitivity.

The photoelectric conversion portion 43 has a lower electrode 43a, an upper electrode 43b, and a photoelectric conversion film 43c sandwiched between the lower electrode 43a and the upper electrode 43b. The photoelectric conversion film 43c absorbs the light emitted from the scintillator 18 and generates electric charge in accordance with an amount of the light absorbed. The lower electrode 43a is preferably made from a conductive material transparent to light of at least the emission wavelength of the scintillator 18 so as to allow the light from the scintillator 18 to be incident on the photoelectric conversion film 43c. To be more specific, it is preferable to use a transparent conductive oxide with high transmittance to the visible light and low resistance.

The photoelectric conversion film 43c is made from amorphous silicon. The photoelectric conversion film 43c absorbs the light emitted from the scintillator 18 and generates the electric charge. The photoelectric conversion film 43c made from the amorphous silicon absorbs the light of a wide wavelength range emitted from the scintillator 18.

An adhesive layer 45 is provided between the light detection section 17 and the top plate 13. The light detection section 17 is adhered to the top plate 13 through the adhesive layer 45.

Figure 7:
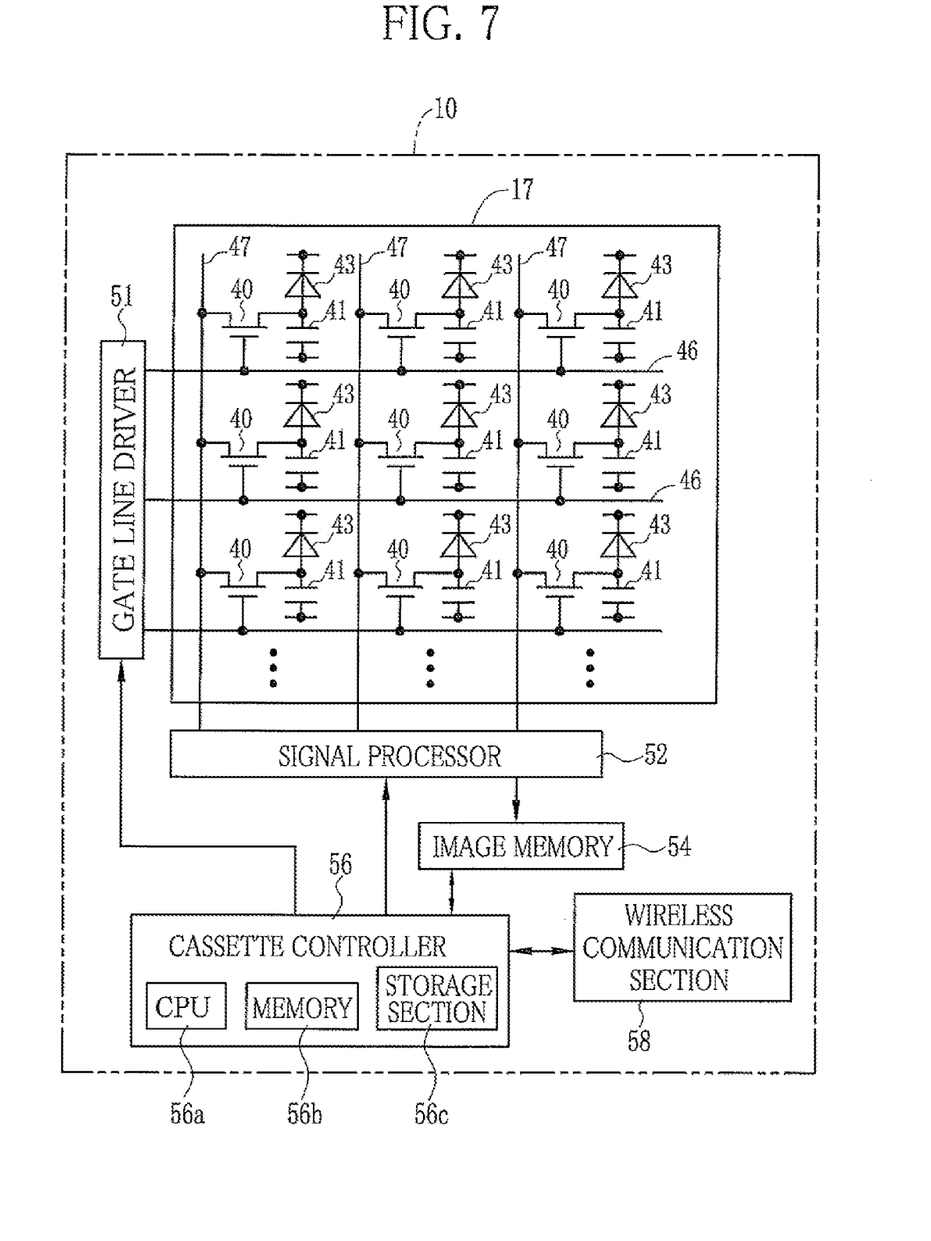
FIG. 7 is a block diagram of an electric configuration of the electronic cassette.

In FIG. 7, the light detection section 17 is provided with a plurality of gate lines 46 and a plurality of data lines 47. Each gate line 46 extends in a row direction and turns on/off the corresponding TFTs 40. Each data line 47 extends in a column direction orthogonal to the row direction and is used for reading the electric charge stored in the corresponding capacitors 41 (and the electric charge stored between the lower electrode 43a and the upper electrode 43b of the photoelectric conversion portion 43) through the TFTs 40 turned on.

The gate lines 46 of the light detection section 17 are connected to a gate line driver 51. The data lines 47 of the light detection section 17 are connected to a signal processor 52. When the radiation passed through the patient's body (namely, the radiation carrying the image information of the patient's body) is incident on the electronic cassette 10, the end portion 31a of each columnar crystal 31 in an area of the scintillator 18 corresponding to the radiation incident surface 11 emits an amount of light proportional to an amount of the radiation incident on the columnar crystal 31. The photoelectric conversion portion 43 generates the electric charge proportional to the amount of light emitted from each end portion 31a. The electric charge is stored in the capacitor 41 (and between the lower electrode 43a and the upper electrode 43b of the photoelectric conversion portion 43).

When the electric charge is stored in the capacitor 41, the TFTs 40 are turned "ON" on a row-by-row basis by a signal supplied from the gate line driver 51 through the corresponding gate line 46. The electric charge stored in the capacitors 41, connected to the TFTs 40 turned on, is transmitted as an analog electric signal through the corresponding data line 47 and then inputted to the signal processor 52. Thus, the electric charge stored in the capacitors 41 is read out on the row-by-row basis.

Each data line 47 of the signal processor 52 is provided with an amplifier and a sample hold circuit (both not shown).

The electric signal transmitted through the data line 47 is amplified in the amplifier, and then held in the sample hold circuit. The sample hold circuit is connected to a multiplexer connected to an A/D converter. The electric signals held in the sample hold circuit are inputted successively to the multiplexer, and then converted into digital image data by the A/D converter.

The signal processor 52 is connected to an image memory 54. The image data outputted from the A/D converter of the signal processor 52 is stored successively in the image memory 54. The image memory 54 has storage capacity enough to store two or more frames of image data. Every time the radiation image is captured, the image data is stored sequentially in the image memory 54.

The image memory 54 is connected to a cassette controller 56 that controls the operation of the whole electronic cassette 10. The cassette controller 56 includes a microcomputer, and is provided with a CPU 56a, a memory 56b including a ROM and a RAM, and a non-volatile storage section 56c including an HDD (hard disk drive), a flash memory, or the like.

A wireless communication section 58 is connected to the cassette controller 56. The wireless communication section 58 conforms to wireless LAN standards, for example, IEEE802.11a/b/g/n, and controls wireless transmission of various types of information between the cassette controller 56 and external device(s). The cassette controller 56 also wirelessly communicates various types of information with a console (not shown) through the wireless communication section 58.

Next, an operation of the electronic cassette 10 of this embodiment is described. Prior to the imaging, the electronic cassette 10 is inserted, with the radiation incident surface 11 facing up, between a body site to be imaged and a base (not shown), and position and direction of the electronic cassette 10 and/or the body site are adjusted.

Thereafter, an operation panel provided on the console is operated to command the start of the imaging. Thereby, the console transmits a signal, which commands the start of X-ray emission, to a radiation generating device (not shown). The radiation generating device emits the radiation from a radiation source (not shown). The radiation passes through the patient's body and then is incident on the radiation incident surface 11 of the electronic cassette 10. Then, the radiation passes through the top plate 13 and the light detection section 17 and then incident on the scintillator 18. The scintillator 18 absorbs the incident radiation and emits the light with the amount corresponding to the amount of the radiation absorbed.

The light produced in the columnar crystal 31 is emitted from the end portion 31a, and then incident on the pixel portion 44 through the resin layer 20. Each end portion 31a has the conical shape with the acute apex angle, which prevents the total reflection of the light. Accordingly, the light is emitted from the end portion 31a efficiently. As shown in FIG. 4, the average refractive index changes gradually or continuously between each end portion 31a (the bottom of the end portion 31a or the boundary between the columnar crystal 31 and its end portion 31a) and the pixel portion 44. This reduces the reflection of the light at the surface of the pixel portion 44. Thus, the light is incident on the pixel portion 44 efficiently.

The light detection section 17 detects the light, incident on the pixel portion 44, as an image. The result of the detection by the light detection section 17 is read out as an image signal. The image signal is converted into the image data and sent to the console.

In the above embodiment, because the end portions 31a of the columnar crystals 31 are embedded in the resin layer 20, the end portions 31a are protected from the load applied to the electronic cassette 10 and shock caused by dropping the electronic cassette 10. Also, positional displacement of the end portions 31a is prevented. The positional displacement of the end portions 31a shifts a position of a defect in the scintillator 18, causing inconvenience in correcting the defect.

Figure 8:
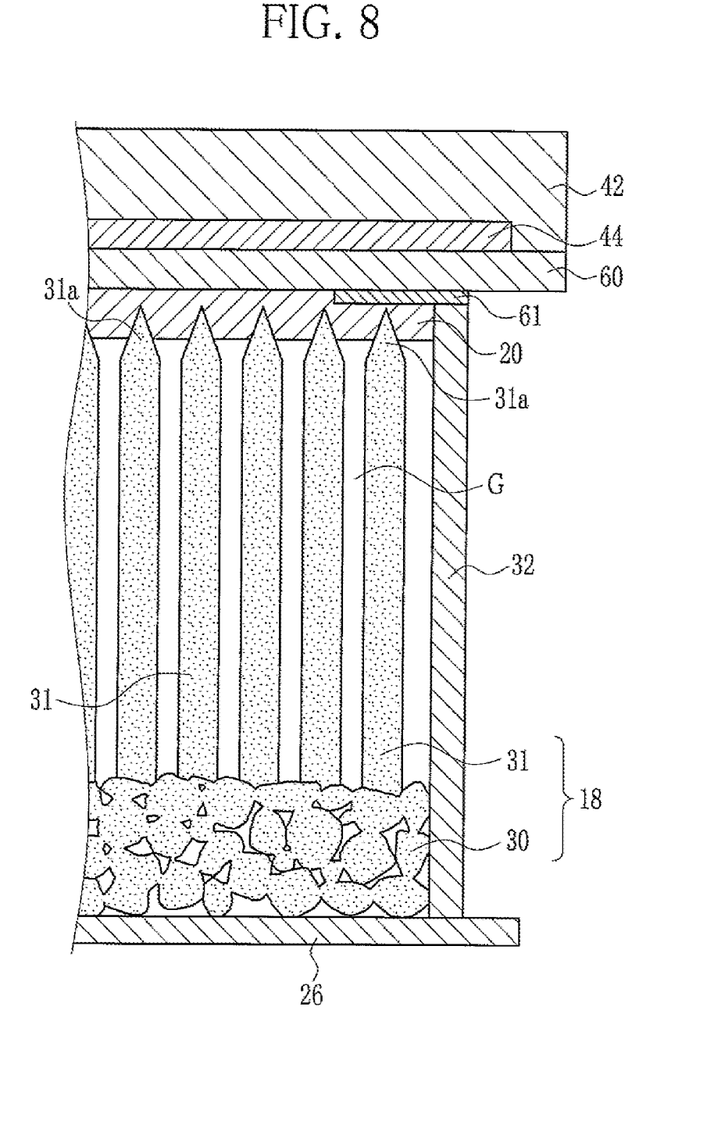
FIG. 8 is a schematic cross-sectional view of an electronic cassette of another embodiment.

Next, the electronic cassette 10 of another embodiment of the present invention is described. In the above embodiment, the resin layer 20 is directly formed on the surface of the pixel portion 44 of the light detection section 17. In this embodiment, on the other hand, a planarizing layer 60 is formed on the surface of the pixel portion 44 as shown in FIG. 8. The resin layer 20 is formed on the planarizing layer 60. The planarizing layer 60 is made from an inorganic material, for example, silicon nitride ($SiN_x$), silicon oxide ($SiO_x$), or silicon oxynitride ($SiO_xN_y$) which does not deform at the room temperature. Thereby, the damage of the pixel portion 44 caused by the end portions 31a of the columnar crystals 31 is prevented with more certainty.

A detachable adhesive 61 is provided on peripheral portions of the planarizing layer 60. The resin layer 20 is attached to or formed on the planarizing layer 60 through the detachable adhesive 61. Adhesion of the detachable adhesive 61 is reduced by UV radiation, for example. When one of the light detection section 17 or the scintillator 18 is damaged and needs replacement, the UV radiation is applied to the detachable adhesive 61 through the resin layer 20 and the like. Thereby, the detachable adhesive 61 loses its adhesion and the light detection section 17 or the scintillator 18 is easily replaced with a new one. Note that the resin layer 20 is formed with the recesses corresponding to the respective end portions 31a of the columnar crystals 31. So, when the scintillator 18 needs replacement, it is preferable to replace the resin layer 20 together with the scintillator 18. The detachable adhesive 61 also facilitates replacing the resin layer 20.

Figure 9:
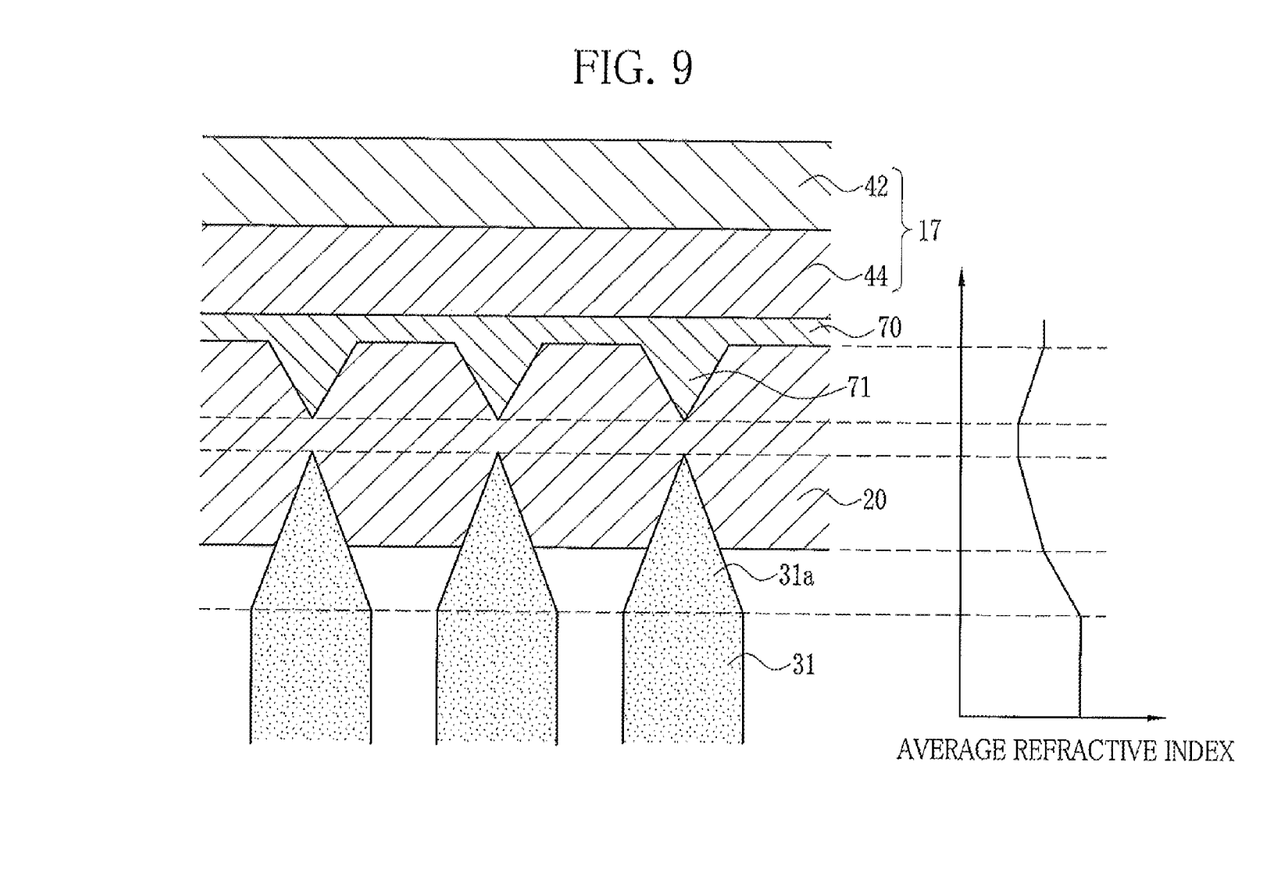
FIG. 9 is a schematic cross-sectional view of an electronic cassette of another embodiment.

In the above embodiments, the average refractive index changes gradually or continuously between the scintillator 18 and the pixel portion 44, depending on the shapes of the end portions 31a of the columnar crystals 31. Alternatively, as shown in FIG. 9, an uneven section 70 may be provided on the surface of the pixel portion 44. The uneven section 70 prevents reflection of the incident light. The uneven section 70 is provided with tapered or pointed projections, for example, conical projections 71 protruding toward the scintillator 18. The projections 71 are embedded in or surrounded by the resin layer 20. The uneven section 70 is formed by micromachining of the inorganic material such as silicon nitride ($SiN_x$), silicon oxide ($SiO_x$), or silicon oxynitride ($SiO_xN_y$) which does not deform at the room temperature. With the use of the uneven section 70, the average refractive index changes more gradually and improves the efficiency of incidence on the pixel portion 44.

In FIG. 9, the projections 71 are formed in positions corresponding to the end portions 31a of the columnar crystals 31. However, the projections 71 may not necessarily be arranged in those positions. To improve anti-reflection property, it is preferable that an arrangement pitch of the projections 71 is smaller than the emission peak wavelength of the scintillator 18.

In the above embodiment, the photoelectric conversion film 43c of the photoelectric conversion portion 43 is made from amorphous silicon. Alternatively, the photoelectric conversion film 43c may be made from a material including an organic photoelectric conversion material. In this case, an absorption spectrum shows high absorption mainly in a visible light range. Accordingly, other than the light emitted from the scintillator 18, the amount of electromagnetic waves absorbed by the photoelectric conversion film 43c is reduced to almost zero. This reduces noise caused by absorption of the radiation such as X-rays and gamma rays by the photoelectric conversion film 43c.

The photoelectric conversion film 43c can be formed by deposition of the organic photoelectric conversion material on the TFT substrate 42 with the use of a droplet ejecting head, for example, an ink jet head. This method does not require the TFT substrate 42 to be heat resistant. In this case, the TFT substrate can be made from a material other than glass.

When the photoelectric conversion film 43c is made from the organic photoelectric conversion material, the photoelectric conversion film 43c hardly absorbs the radiation. This reduces an amount of the radiation attenuated by passing through the light detection section 17 of the ISS type electronic cassette 10. Accordingly, the photoelectric conversion film 43c made from the organic photoelectric conversion material is suitable especially for the ISS type electronic cassette 10.

To absorb the light, emitted from the scintillator 18, most efficiently, it is preferable that an absorption peak wavelength of the organic photoelectric conversion material of the photoelectric conversion film 43c is as close to the emission peak wavelength of the scintillator 18 as possible. It is ideal that the absorption peak wavelength of the organic photoelectric conversion material coincides with the emission peak wavelength of the scintillator 18. The light emitted from the scintillator 18 is sufficiently absorbed by the photoelectric conversion film 43c when a difference between the absorption peak wavelength of the organic photoelectric conversion material and the emission peak wavelength of the scintillator 18 is small. To be more specific, the difference between the absorption peak wavelength of the organic photoelectric conversion material and the emission peak wavelength of the scintillator 18 is preferably less than or equal to 10 nm, and more preferably less than or equal to 5 nm.

Examples of the organic photoelectric conversion materials satisfying the above conditions include a quinacridone organic compound and a phthalocyanine organic compound. An absorption peak wavelength in a visible range of quinacridone is 560 nm. Using the quinacridone for the organic photoelectric conversion material and the CsI:Tl for the material of the scintillator 18 makes it possible to set the difference between the absorption peak wavelength and the emission peak wavelength less than or equal to 5 nm. This maximizes the amount of the electric charge generated in the photoelectric conversion film 43c.

An example of the photoelectric conversion film 43c applicable to the radiation detection device is described. In the radiation detection device, an organic layer including the electrodes 43a and 43b and the photoelectric conversion film 43c, sandwiched between the electrodes 43a and 43b, corresponds to an electromagnetic absorption/photoelectric conversion section. To be more specific, the organic layer includes an electromagnetic wave absorbing portion, a photoelectric conversion portion, an electron transporting portion, a positive hole transporting portion, an electron blocking portion, a positive hole blocking portion, a crystallization preventing portion, an electrode, an interlayer contact improving portion, and the like, which are layered or mixed.

The organic layer preferably contains a p-type organic compound or an n-type organic compound. A hole-transporting organic compound typifies the p-type organic compound, being a donor organic semiconductor (compound). The p-type organic compound tends to donate electrons. To be more specific, when two types of organic materials are used in contact with each other, the p-type organic compound is the one with lower ionization potential. Any organic compound is available as the donor organic compound as long as the organic compound has electron donating property. An n-type organic compound, being an acceptor organic semiconductor (compound) tends to accept electrons. An electron-transporting organic compound typifies the n-type organic compound. To be more specific, when two types of organic materials are used in contact with each other, the n-type organic compound is the one with higher electron affinity. Any organic compound is available as the acceptor organic compound as long as the organic compound has electron accepting property.

Materials of the p- and n-organic compounds and a configuration of the photoelectric conversion film 43c are described in U.S. Application Publication No. 2009/0026379 corresponding to Japanese Patent Laid-Open Publication No. 2009-032854, so descriptions thereof are omitted.

The photoelectric conversion portion 43 at least includes the photoelectric conversion film 43c and the electrode pair 43a and 43b. Additionally, it is preferable to provide at least one of an electron blocking film and a hole blocking film to prevent increase in the dark current. It is more preferable to provide both the electron blocking film and the hole blocking film.

The electron blocking film is provided between the upper electrode 43b and the photoelectric conversion film 43c. When a bias voltage is applied between the upper electrode 43b and the lower electrode 43a, the electron blocking film prevents electron injection from the upper electrode 43b to the photoelectric conversion film 43c, and thus prevents the increase in the dark current. The electron blocking film is made from an electron-donating organic material. The electron-donating organic material can be selected depending on a material of the adjacent electrode, a material of the adjacent photoelectric conversion film 43c, or the like. The electron-donating organic material preferably has electron affinity (Ea) greater than work function (Wf) of the material of the adjacent electrode by 1.3 eV or more, and ionization potential (Ip) less than or equal to that of the material of the adjacent photoelectric conversion film 43c. Examples of the electron donating organic materials are described in the U.S. Application Publication No. 2009/0026379, so descriptions thereof are omitted.

To certainly reduce the dark current and prevent reduction in photoelectric conversion efficiency of the photoelectric conversion portion 43, the thickness of the electron blocking film is preferably 10 nm or more and 200 nm or less, more preferably 30 nm or more and 150 nm or less, most preferably 50 nm or more and 100 nm or less.

The hole blocking film is provided between the photoelectric conversion film 43c and the lower electrode 43a. When a bias voltage is applied between the upper electrode 43b and the lower electrode 43a, the hole blocking film prevents hole injection from the lower electrode 43a to the photoelectric conversion film 43c, and thus prevents the increase in the dark current. The hole blocking film is made from an electron-accepting organic material. The electron-accepting organic material can be selected depending on a material of the adjacent electrode, a material of the adjacent photoelectric conversion film 43c, or the like. The electron-accepting organic material preferably has the ionization potential (Ip) greater than work function (Wf) of the material of the adjacent electrode by 1.3 eV or more, and the electron affinity (Ea) greater than or equal to that of the material of the adjacent photoelectric conversion film 43c. The examples of the electron accepting organic materials are described in the U.S. Application Publication No. 2009/0026379, so descriptions thereof are omitted.

To certainly reduce the dark current and prevent reduction in the photoelectric conversion efficiency of the photoelectric conversion portion 43, the thickness of the hole blocking film is preferably 10 nm or more and 200 nm or less, more preferably 30 nm or more and 150 nm or less, most preferably 50 nm or more and 100 nm or less.

Note that, if the bias voltage is applied such that the holes of the electric charge produced in the photoelectric conversion film 43c move to the lower electrode 43a, and the electrons move to the upper electrode 43b, the positions of the electronic blocking film and the hole blocking film are reversed. It is not required to provide both the electron blocking film and the hole blocking film. At least one of the electron blocking film and the hole blocking film reduces the dark current to a certain degree.

As the amorphous oxide for forming an active layer of the TFT 40, oxides (for example, In—O oxide) containing at least one of In, Ga, and Zn are preferable, and oxides (for example, In—Zn—O oxide, In—Ga—O oxide, and Ga—Zn—O oxide) containing at least two of In, Ga, and Zn are more preferable, and oxides containing all of In, Ga, and Zn are most preferable. As In—Ga—Zn—O amorphous oxide, an amorphous oxide of a composition represented by $InGaO_3(ZnO)m$ (m denotes a natural number less than 6) in a crystalline state is preferable, and especially, $InGaZnO_4$ is more preferable. Note that, the amorphous oxide used for forming the active layer is not limited to the above.

An organic semiconductor material for forming the active layer includes a phthalocyanine organic compound, pentacene, vanadyl phthalocyanine, or the like, but is not limited to them. Note that the composition of the phthalocyanine organic compound is described in U.S. Patent Application Publication No. 2009/0224235 corresponding to Japanese Patent Laid-Open Publication No. 2009-212389, so the descriptions thereof are omitted.

Noise is effectively reduced by making the active layer of the TFT 40 from one of the amorphous oxides, the organic semiconductor material, and a carbon nanotube because these materials do not or hardly absorb the radiation such as the X-rays.

The active layer made of the carbon nanotube can accelerate the switching speed of the TFT 40, and reduce an amount of light absorption in the visible light range by the TFT 40. Note that when the active layer is made of the carbon nanotube, the performance of the TFT 40 significantly degrades only with a slight amount of metal impurity. To prevent the degradation of the TFT 40 during manufacture, it is necessary to isolate and extract the carbon nanotube with extremely high purity using centrifugation.

The TFT substrate 42 can be made from any material as long as it is light transparent and has low radiation absorptivity. Both the amorphous oxide for making the active layer of the TFT 40 and the organic photoelectric conversion material for making the photoelectric conversion film 43c of the photoelectric conversion portion 43 can be deposited at low temperature. Thus, the TFT substrate 42 is not limited to a substrate with high heat-resistance, for example, a semiconductor substrate, a quarts substrate, or a glass substrate. The TFT substrate 42 can be a flexible substrate made from plastics, aramid, or bionanofiber. To be more specific, the TFT substrate 42, being the flexible substrate, can be made from polyester (e.g. polyethylene terephthalate, polybutylene phthalate, or polyethylene naphthalate), polystyrene, polycarbonate, polyether sulfone, polyalirate, polyimide, polycycloolefin, norbornene resin, poly (chlorotrifluoroethylene), or the like. Using the flexible substrate made from the plastics reduces weight and improves portability. Note that, the TFT substrate 42 may be provided with an insulating layer for securing insulation, a gas barrier layer for preventing transmission of moisture and oxygen, an undercoat layer for improving flatness and adhesion to the electrode, and the like.

Because the aramid can be subjected to high temperature process of 200° C. or more, a transparent electrode material can be cured at high temperature to reduce its resistance. Aramid can be used in automatic mounting of a driver IC including a reflow soldering process. The aramid has a coefficient of thermal expansion close to those of ITO (indium tin oxide) and the glass substrate. This prevents warping and cracking after manufacture. The substrate made from the aramid can be thinner than the glass substrate. The TFT substrate 42 can be an ultra-slim glass substrate with an aramid layer.

The bionanofiber is a composite of a cellulose microfibril bundle (bacterial cellulose) produced by bacteria (*acetobacter xylinum*) and transparent resin. The cellulose microfibril bundle has a width of 50 nm, being one-tenth of the wavelength of the visible light, and high strength, high elasticity, and low thermal expansion. Impregnating the transparent resin such as acrylic resin or epoxy resin to the bacterial cellulose and hardening it produces the bionanofiber which contains much fiber (60% to 70%) and has light transmittance of approximately 90% at a wavelength of 500 nm. The bionanofiber has a low coefficient of thermal expansion (3 ppm to 7 ppm) comparable to a silicon crystal, high strength (460 MPa) comparable to steel, high elasticity (30 GPa), and flexibility. Thus, the TFT substrate 42 made from the bionanofiber can be thinner than the glass substrate or the like.

When the TFT substrate 42 is made of glass, the thickness of the whole light detection section 17 is of the order of 0.7 mm. The thickness of the whole light detection section 17 is reduced to of the order of 0.1 mm when the TFT substrate 42 is a thin substrate made from light-transparent synthetic resin. This also provides flexibility to the light detection section 17. The flexible light detection section 17 improves the shock resistance of the electronic cassette 10. The TFT substrate 42 may be made from a material with small radiation absorption power, for example, plastics, aramid, or bionanofiber. This prevents reduction in sensitivity of the TFT substrate 42 of the ISS type.

In the above embodiments, the ISS type radiation detection device is described by way of example. The present invention is also applicable to the PSS type radiation detection device. An electronic cassette is described as an example of the radiation detection device. The present invention is also applicable to a standing type or a lying type radiation detection device, or a mammography device, for example.

Various changes and modifications are possible in the present invention and may be understood to be within the present invention.

What is claimed is:

1. A radiation detection device comprising:
    a scintillator having a plurality of columnar crystals arranged upright, the scintillator converting incident radiation into light and emitting the light from end portions of the columnar crystals;
    a light detection section disposed to face the end portions of the columnar crystals, the light detection section detecting the light from the end portions; and
    a resin layer disposed between the scintillator and the light detection section, the resin layer having recesses formed by the end portions pressed against the resin layer, at least a part of the each end portion being embedded in the each recess, the resin layer passing the light from the end portions.

2. The radiation detection device of claim 1, wherein the resin layer is made from a thermosetting resin material.

3. The radiation detection device of claim 1, wherein the resin layer passes light having an emission peak wavelength of the scintillator.

4. The radiation detection device of claim 1, wherein a refractive index of the resin layer is lower than a refractive index of the scintillator.

5. The radiation detection device of claim 1, wherein the end portion of the columnar crystal is tapered.

6. The radiation detection device of claim 1, wherein the columnar crystals are separated from each other by a gap between them.

7. The radiation detection device of claim 1, wherein the radiation passed through the light detection section is incident on the scintillator.

8. The radiation detection device of claim 1, wherein the scintillator is made from cesium iodide.

9. The radiation detection device of claim 1, wherein the light detection section has a substrate and a pixel portion formed on the substrate, and the resin layer is formed on the pixel portion.

10. The radiation detection device of claim 9, wherein an average refractive index changes continuously between the end portions and the pixel portion.

11. The radiation detection device of claim 1, wherein the light detection section has a substrate and a pixel portion formed on the substrate, and a planarizing layer is formed on the pixel portion, and the resin layer is formed on the planarizing layer.

12. The radiation detection device of claim 11, wherein a detachable adhesive is provided on a peripheral portion of the planarizing layer between the planarizing layer and the resin layer.

13. The radiation detection device of claim 12, wherein adhesion of the detachable adhesive is reduced by applying UV radiation.

14. The radiation detection device of claim 1, wherein the light detection section has a substrate and a pixel portion formed on the substrate, and an uneven section is formed on the pixel portion, and the uneven section has a plurality of projections protruding toward the scintillator, and the resin layer is formed such that the projections are embedded in the resin layer.

15. The radiation detection device of claim 11, wherein the planarizing layer is made from an inorganic material.

16. The radiation detection device of claim 14, wherein the uneven section is made from an inorganic material.

17. The radiation detection device of claim 14, wherein an arrangement pitch of the projections is smaller than an emission peak wavelength of the scintillator.

18. The radiation detection device of claim 1, wherein the end portions are in contact with the light detection section.

* * * * *